US008147078B2

(12) United States Patent
Idera

(10) Patent No.: US 8,147,078 B2
(45) Date of Patent: Apr. 3, 2012

(54) ILLUMINATION APPARATUS AND IMAGE PICKUP APPARATUS

(75) Inventor: Shuichi Idera, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/554,496

(22) Filed: Sep. 4, 2009

(65) Prior Publication Data
US 2010/0061102 A1    Mar. 11, 2010

(30) Foreign Application Priority Data

Sep. 10, 2008  (JP) .................................. 2008-232118

(51) Int. Cl.
*G03B 15/03*  (2006.01)
(52) U.S. Cl. ............ 362/16; 362/310; 362/329; 396/176
(58) Field of Classification Search ................ 362/3, 16, 362/309, 310, 328, 329; 396/176, 200; 348/371
See application file for complete search history.

(56) References Cited

U.S. PATENT DOCUMENTS

| 5,641,218 A | 6/1997 | Sakurai |
| 5,926,658 A | 7/1999 | Tenmyo |
| 6,011,929 A * | 1/2000 | Fuke et al. ................ 396/175 |
| 6,088,540 A * | 7/2000 | Leidig et al. ................ 396/155 |
| 6,471,375 B2 * | 10/2002 | Kobayashi et al. ........... 362/285 |
| 6,997,571 B2 * | 2/2006 | Tenmyo ........................ 362/16 |

FOREIGN PATENT DOCUMENTS

JP    3544066    7/2004

OTHER PUBLICATIONS

The above reference was cited in a Feb. 23, 2011 Chinese Office Action, which is enclosed with English Translation, that issued in Chinese Patent Application No. 200910172148.2.

* cited by examiner

*Primary Examiner* — Peggy A. Neils
(74) *Attorney, Agent, or Firm* — Cowan, Liebowitz & Latman, P.C.

(57) ABSTRACT

The illumination apparatus includes a light source, an optical member configured to at least transmit therethrough light from the light source, and a reflective member configured to include a reflective portion which extends closer to the optical member than the light source and reflects the light from the light source to cause the light to enter the optical member. A concave portion is formed, on a light entrance side surface of the optical member, in an outside area located outside a light entrance area where the light reflected by the reflective portion reaches. The concave portion includes a refractive surface refracting light, which is part of the light from the light source and enters the concave portion without being reflected by the reflective portion, toward an exit surface of the optical member.

3 Claims, 5 Drawing Sheets

ILLUMINATION APPARATUS AND IMAGE PICKUP APPARATUS

BACKGROUND OF THE INVENTION

The present invention relates to an illumination apparatus which is suitable for image pickup apparatuses and includes a reflective member reflecting light from a light source.

The above-described illumination apparatus is used, for example, as a flash unit for image pickup apparatuses such as digital cameras. The illumination apparatus includes an optical member such as a Fresnel lens which transmits light from the light source such as a discharge light emitting tube to control a light irradiation range, and a reflective member which reflects part of the light from the light source to return it to the light source and to introduce it to the optical member.

Japanese Patent No. 3544066 discloses an illumination apparatus including a reflective member in which its rear portion disposed on a rear side with respect to a center of a light source is formed into an elliptical shape whose focal point is located at the center of the light source, and its front portion disposed on a front side with respect to the center of the light source is formed into a cylindrical shape whose center is located at the center of the light source.

With miniaturization of the image pickup apparatus equipped with such an illumination apparatus, miniaturization of the illumination apparatus itself is also required.

However, the miniaturization of the illumination apparatus causes the light source and the front portion of the reflective member to be disposed closer to an optical member formed of optical plastic, which may melt the optical member by heat from the light source and the front portion of the reflective member. Moreover, in a case where a chassis of the image pickup apparatus is formed of metal, a creepage distance between the light source and the chassis reduces, which makes it easy to cause an electrical leak from the light source to the chassis.

Covering the light source and the reflective member by a heat-resistant optical member makes it possible to prevent the melting of the optical member and generation of the electrical leak. However, the optical member disperses light from the light source at a periphery of its light exit region, which may make it impossible to efficiently introduce the light to a required irradiation range.

SUMMARY OF THE INVENTION

The present invention provides an illumination apparatus having high heat resistance and being capable of efficiently introducing light from a light source to a required irradiation range, and provides an image pickup apparatus including the illumination apparatus.

The present invention provides as one aspect thereof an illumination apparatus which includes a light source, an optical member configured to at least transmit therethrough light from the light source, and a reflective member configured to include a reflective portion which extends closer to the optical member than the light source and reflects the light from the light source to cause the light to enter the optical member. A concave portion is formed, on a light entrance side surface of the optical member, in an outside area located outside a light entrance area where the light reflected by the reflective portion reaches. The concave portion includes a refractive surface refracting light, which is part of the light from the light source and reaches the concave portion without being reflected by the reflective portion, toward an exit surface of the optical member.

The present invention provides as another aspect thereof an image pickup apparatus capturing an image of an object illuminated with light from the above-mentioned illumination apparatus.

DESCRIPTION OF THE EMBODIMENTS

Exemplary embodiments of the present invention will be described hereinafter with reference to the accompanying drawings.

Figure 7:
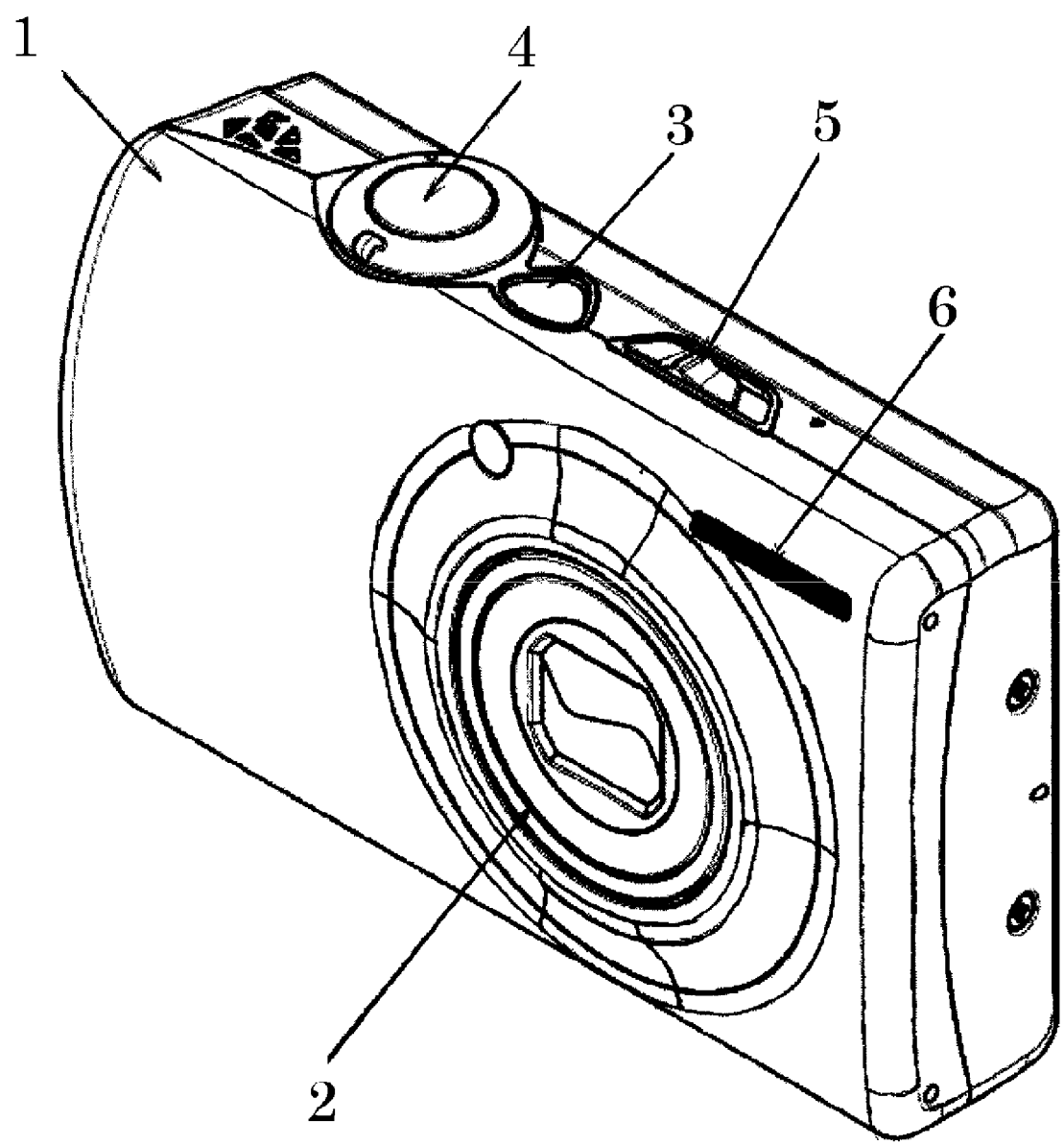
FIG. 7 shows a front perspective view of a camera equipped with the flash unit of the embodiment.

FIG. 7 shows an exterior of a digital still camera as an image pickup apparatus or an optical apparatus (hereinafter simply referred to as "camera") equipped with a built-in flash unit as an illumination apparatus that is an embodiment of the present invention.

Reference numeral 1 denotes a chassis that is an exterior member of the camera. Reference numeral 2 denotes a lens barrel including an image pickup optical system (not shown). Reference numeral 3 denotes a power on/off button, and reference numeral 4 denotes a release button. Reference numeral 5 denotes a select lever for changing an image pickup mode of the camera or the like. Reference numeral 6 denotes the above-mentioned flash unit.

The camera having the above-described configuration can capture an image of an object illuminated with light from the flash unit 6. The illumination for the object makes it possible to obtain a good captured image.

FIGS. 1, 2, 3 and 4 show the flash unit 6 and a peripheral configuration thereof.

Reference numeral 16 denotes a flexible substrate on which electrical elements constituting an electrical circuit for enabling a xenon (Xe) tube (discharge light emitting tube) 9 that is a light source of the flash unit 6 to emit light are mounted. Lands (not shown) are formed around hole portions 16b formed on the flexible substrate 16. Reference numeral 15 denotes a main capacitor 15 which accumulates charges for light emission of the Xe tube 16. Terminals 15a of the main capacitor 15 are inserted through the hole portions 16b and then soldered to the lands.

In addition, a lead wire 16c, a lead wire 16d and a lead wire 16f with a connector is connected to the flexible substrate 16. The flexible substrate 16 is positioned with respect to a flash base member 11 by a boss 11f, which is formed on the flash base member 11, being inserted into a hole portion 16a formed on the flexible substrate 16, and the flexible substrate 16 is then fixed to the flash base member 11 with a double-sided tape or the like.

In the flash unit 6, the Xe tube 9 having a cylindrical straight tube shape is disposed in a hole portion 8b formed inside a reflective member 8. Both ends of the Xe tube 9 in its longitudinal direction are inserted into hole portions 10a formed in silicon rubber rings 10 having heat resistance and electrical insulation. The silicon rubber rings 10 are disposed so as to come into contact with both ends of the hole portion 8b of the reflective member 8. Thus, the Xe tube 9 is held by the reflective member 8 in a state where the Xe tube 9 is positioned with respect to the reflective member 8.

In the following description, a direction in which light exits from the flash unit 6 toward the object (light irradiation direction or irradiation optical axis direction) is referred to as "front" or "front side", and an opposite side thereto is referred to as "rear" or "rear side".

The reflective member 8 reflects light emitted from the Xe tube 9. The reflective member 8 is formed of a metal material such as bright aluminum whose inner surface is formed as a high reflectance surface or a resin material whose inner surface is formed as a high reflectance metal vapor deposited surface.

Ends of the lead wires 16c and 16d connected to the flexible substrate 16 are soldered to electrodes 9a provided at both ends of the Xe tube 9 in its longitudinal direction.

Figure 1:
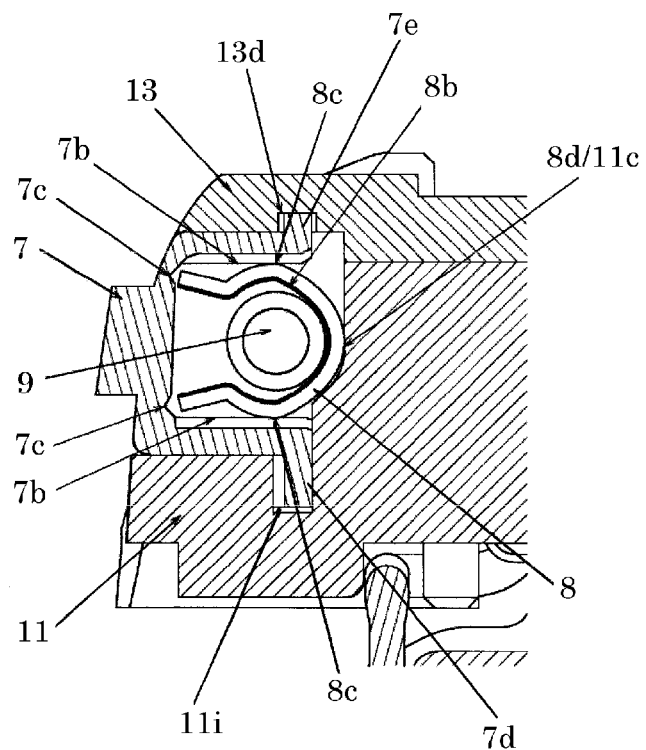
FIG. 1 shows a cross-sectional view of a flash unit that is an embodiment of the present invention (a cross-sectional view at an A-A line in FIG. 2).
Figure 2:
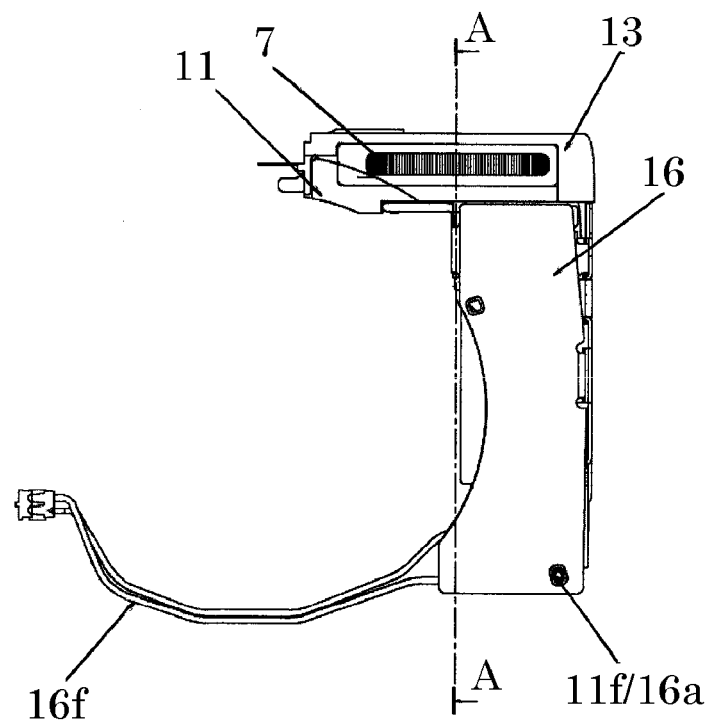
FIG. 2 shows a front view of the flash unit of the embodiment.
Figure 3:
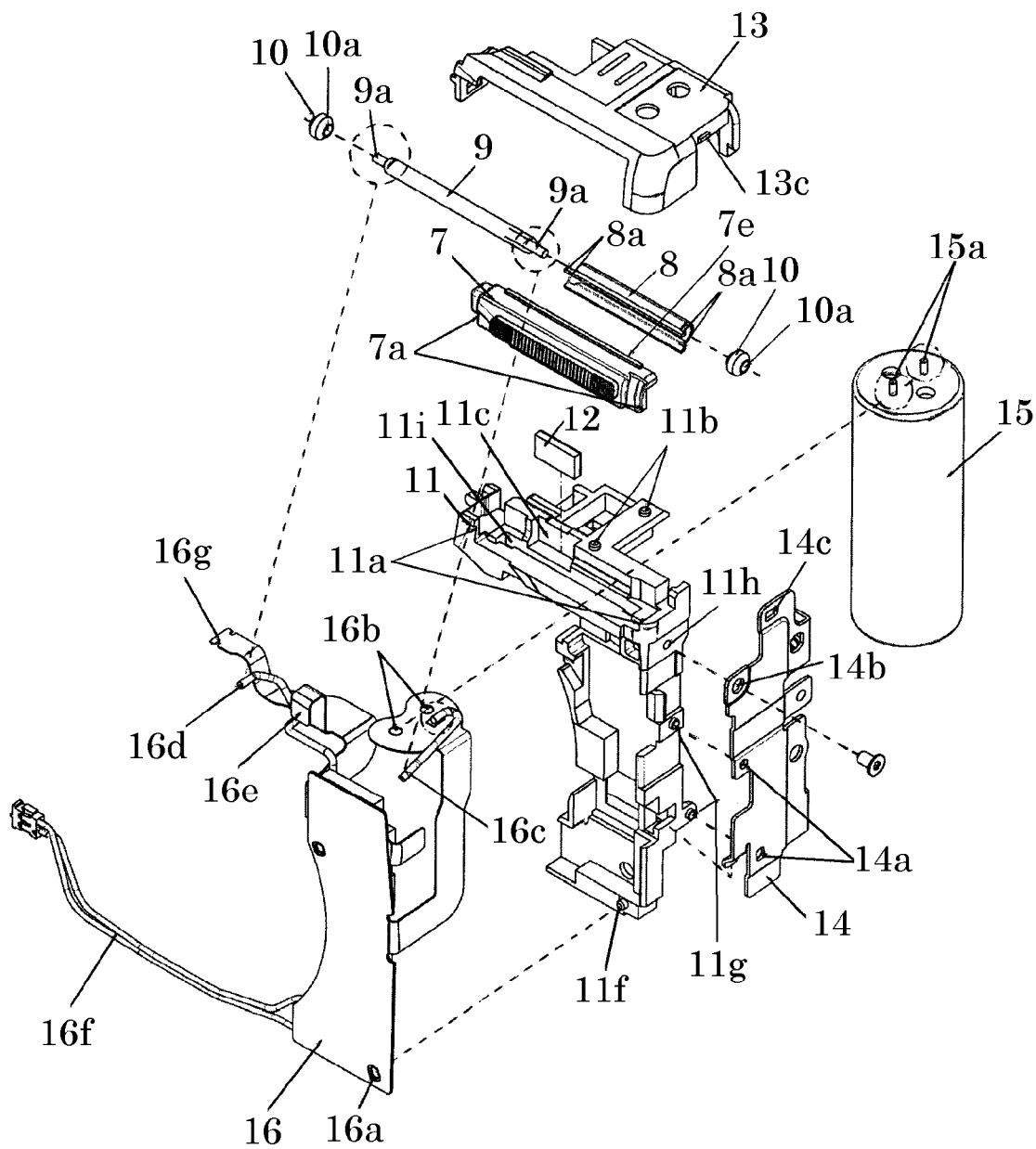
FIG. 3 shows an exploded perspective view of the flash unit of the embodiment.
Figure 4:
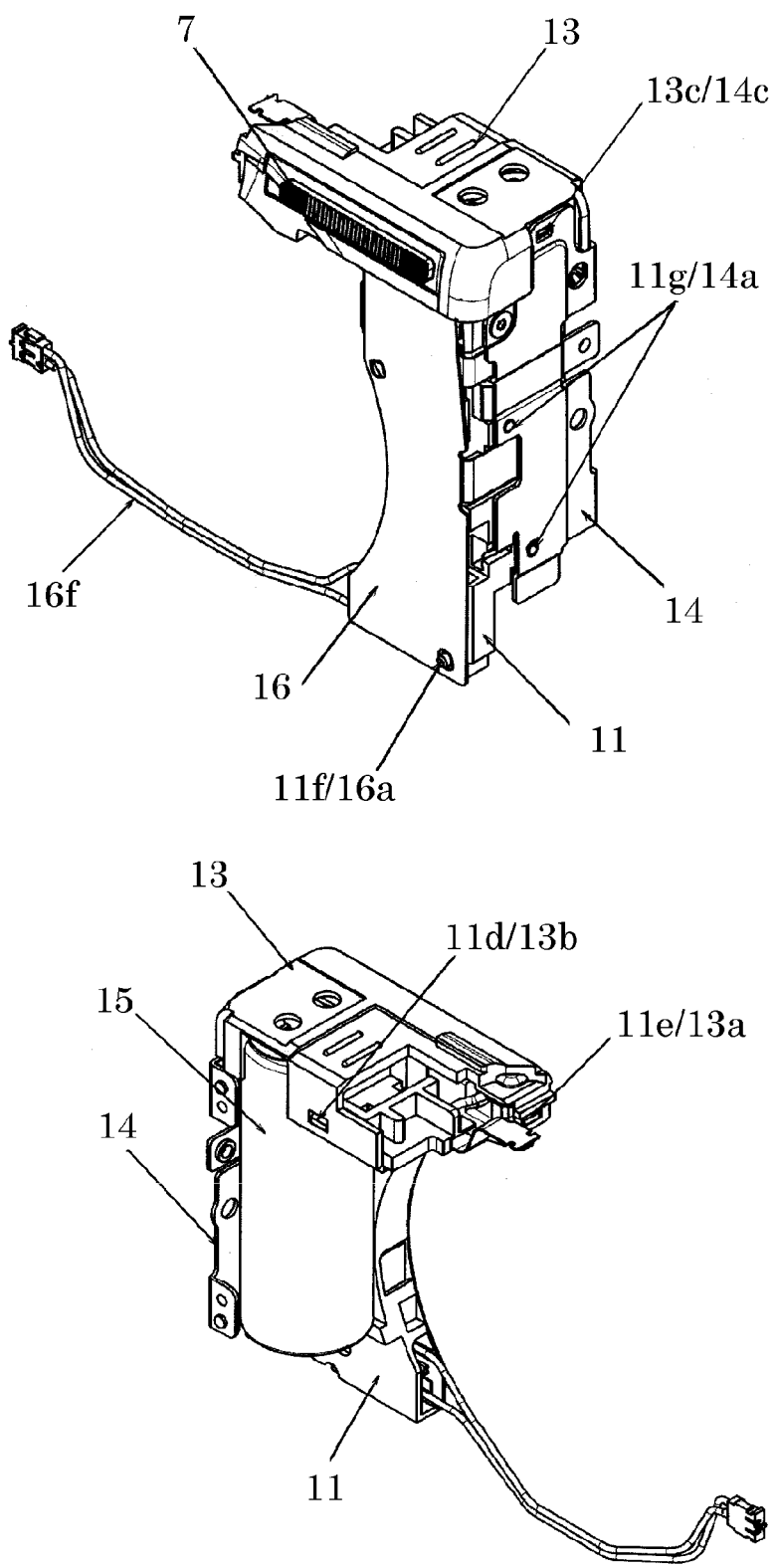
FIG. 4 shows a front perspective view and a back perspective view of the flash unit of the embodiment.

The reflective member 8 holding the Xe tube 9 is held by a prism panel 7 that is an optical member. As shown in FIG. 1, the prism panel 7 is formed, in a cross-section orthogonal to its longitudinal direction, into a shape covering a front side part of the reflective member 8 (and the Xe tube 9) from a position on the rear side further than a center of the Xe tube 9.

Ribs 7b are formed on an upper inner surface and a lower inner surface of the prism panel 7. The contact of the upper and lower ribs 7b with an upper outer surface and a lower outer surface of the reflective member 8 causes the prism panel 7 to hold the Xe tube 9 and the reflective member 8 in an upper-and-lower direction. Ribs 8a formed at both ends of the reflective member 8 face ribs (not shown) formed at both ends of the prism panel 7 in their longitudinal direction with an adequate clearance therebetween, which causes the prism panel 7 to hold the Xe tube 9 and the reflective member 8 in their longitudinal direction (right-and-left direction).

The prism panel 7 is formed of a light-transmissive material which is capable of transmitting light therethrough. It is preferable to use as the light-transmissive material an optical organic polymeric material with a high transmittance such as polymethyl methacrylate (PMMA).

Protrusions 7a formed at both ends of the prism panel 7 in its longitudinal direction are brought into contact with walls 11a formed at both sides of a flash base member 11 in the same direction. Thus, the prism panel 7 (that is, the flash unit 6) is positioned with respect to the flash base member 11 in the right-and-left direction. Moreover, a rib 7b formed at a rear end of a lower portion of the prism panel 7 is inserted into a groove portion 11i formed on the flash base member 11. Thereby, the flash unit 6 is positioned with respect to the flash base member 11 in a front-and-rear direction.

A rubber plate 12 is inserted into a concave portion 11c formed on the flash base member 11 so as to face a back surface 8d of the reflective member 8. A reflective member connecting portion 16e formed on the flexible substrate 16 is sandwiched between the rubber plate 12 and a back surface 8d of the reflective member 8. The rubber plate 12 presses by its elastic force the reflective member connecting portion 16e to the back surface 8d of the reflective member 8. The reflective member connecting portion 16e supplies a trigger voltage for causing the Xe tube 9 to start light emission on a transparent electrode (not shown) formed on a surface of the Xe tube 9 through the reflective member 8.

A flash cover 13 is attached to the flash base member 11 so as to cover an upper surface of the flash unit 6. Two bosses 11b formed on the flash base member 11 are inserted into two hole portions (not shown) formed on the flash cover 13. Engaging claws 11d and 11e formed on the flash base member 11 respectively engage with the hole portions 13b and 13a formed on the flash cover 13. Thereby, the flash cover 13 is fixed to the flash base member 11. A rib 7e formed on the prism panel 7 is inserted into a groove portion 13d formed on the flash cover 13. Thereby, the flash unit 6 is positioned with respect to the flash cover 13 and the flash base member 11 in a front-and-rear direction.

A flash plate 14 is attached to a side face of the flash base member 11. The flash plate 14 is mounted by screws on a main chassis (not shown) which holds the lens barrel 2 and a main substrate (not shown) on which an image processing circuit and a system controlling circuit are formed, thereby fixing the flash base member 11 to the main chassis. A boss 11g formed on the flash base member 11 is inserted into a hole portion 14a formed on the flash plate 14. The flash plate 14 is fixed to the flash base member 11 by a screw being inserted into a hole portion 14b formed on the flash plate 14 and a screw hole portion 11h formed on the flash base member 11 and then being tighten. In addition, an engaging claw 13c formed on the flash cover 13 engages with a hole portion 14c formed on the flash plate 14.

A connector 16g provided on the lead wire 16f connected to the flexible substrate 16 is connected to a connector mounted on the above-mentioned main substrate. This makes it possible to supply power or signals from the main substrate to the flexible substrate 16.

Next, description will be made of a more detailed configuration and optical actions of the flash unit 6 using FIG. 5.

The reflective member 8 includes an elliptical portion 8e formed on the rear side further than the center of the Xe tube 9 (hereinafter referred to as "light source center"), and cylindrical portions 8f formed at upper and lower positions on the front side further than the light source center. In addition, the reflective member 8 includes upper and lower inclined portions which are reflective portions (a first reflective portion and a second reflective portion) 8g formed so as to extend toward the front (that is, an optical member side or a prism panel side) from the upper and lower cylindrical portions 8f.

Lights emitted from the Xe tube 9 rearward, upward and downward are reflected by the elliptical portion 8e and the upper and lower cylindrical portions 8f to be returned to the Xe tube 9. On the other hand, lights (hereinafter referred to as "first lights") emitted from the Xe tube 9 obliquely front-upward and obliquely front-downward are reflected by the upper and lower inclined portions 8g, and then pass through an aperture (opening) 8h formed between the upper and lower inclined portions 8g to be introduced to the prism panel 7. The aperture 8h has an aperture width H.

Light emitted from the Xe tube 9 forward (hereinafter referred to as "second light") passes through the aperture 8h to proceed toward the prism panel 7 without being reflected by the reflective member 8.

The prism panel 7 includes an entrance surface 7m in an area which faces the aperture 8h, and an exit surface 7n located on the front side further than the entrance surface 7m. The prism panel 7 at least transmits therethrough the light from the Xe tube 9.

The above-mentioned first lights and second light enter the prism panel 7 from the entrance surface 7m. An upper inner surface and a lower inner surface disposed between the entrance surface 7m and the exit surface 7n in the prism panel 7 are formed as internal reflective surfaces (hereinafter referred to as "total reflective surface") 7o which introduces, by internal total reflection, part of the light reaching from the entrance surface 7m to the exit surface 7n. The light entering the prism panel 7 is collected by refraction at the entrance surface 7m and the exit surface 7n and the internal total reflection at the total reflective surfaces 7o to exit toward a required irradiation range on the object side with a homogeneous light distribution. In the prism panel 7, an area surrounded by the entrance surface 7m, the exit surface 7n and the total reflective surfaces 7o is referred to as "light collecting portion".

In upper and lower outside areas located outside the area facing the aperture 8h (that is, the entrance surface 7m) in the upper-and-lower direction on the light entrance side surface of the prism panel 7, concave portions 7c are formed which are concave so as to be away from front ends of the upper and lower inclined portions 8g. The upper and lower outside areas where the concave portions 7c are formed on the light entrance surface of the prism panel 7 are located outside an area where the light reflected by the upper and lower inclined portions 8g reaches. Each of the concave portions 7c has a V-groove shape in the cross-section shown in FIG. 5.

Figure 6:
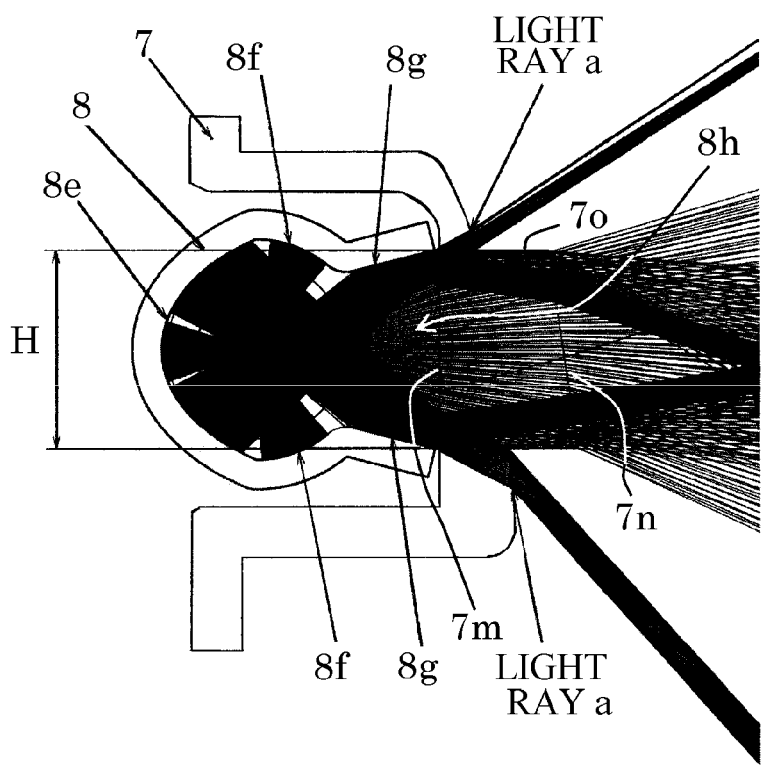
FIG. 6 shows a ray tracing chart of the flash unit when a concave portion is not formed on a prism panel.

FIG. 6 shows a flash unit as a comparative example in which the concave portion 7c is not formed on the prism panel 7. Lights (for example, light rays a, and hereinafter referred to as "third lights") emitted from the Xe tube 9 between the first lights emitted therefrom obliquely front-upward and obliquely front-downward and the second light emitted therefrom forward reach the upper and lower outside areas outside the entrance surface 7m on the light entrance side surface of the prism panel 7 without being reflected by the inclined portions 8g.

Then, the third lights exit from upper and lower outside areas outside the exit surface 7n on a light exit side surface of the prism panel 7 toward the outside (object side). The third lights are not collected by the light collecting portion of the prism panel 7, thereby proceeding toward an area outside the required irradiation range. Therefore, a light irradiation amount for the required irradiation range decreases, so that a guide number of the flash unit reduces.

Figure 5:
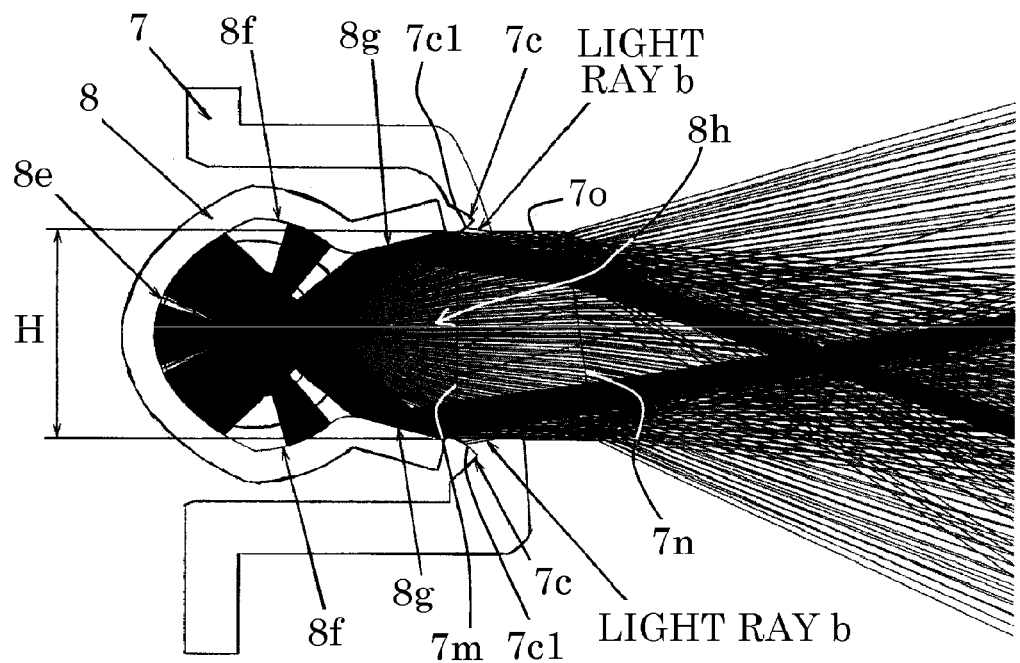
FIG. 5 shows a ray tracing chart of the flash unit of the embodiment.

In contrast thereto, in the flash unit of the present embodiment shown in FIG. 5, the third lights reaching the concave portions 7c (for example, light rays b, which are part of the light emitted from the Xe tube 9 and reaching the concave portion 7c without being reflected by the inclined portions 8g) are refracted by refractive surfaces 7c1 each constituting each of the concave portions 7c toward the exit surface 7n of the prism panel 7. Therefore, the third lights also proceed toward the required irradiation range as with the first and second lights. Thus, the guide number is improved as compared with the flash unit shown in FIG. 6.

The refractive surface 7c1 also serves as an internal reflective surface which internally totally reflects light (hereinafter referred to as "fourth light") proceeding toward the refractive surface 7c1 in the light entering the prism panel 7 from the entrance surface 7m to introduce it to the exit surface 7n. This makes it possible to introduce to the required irradiation range the fourth light which is not reflected by the total reflective surface 7o of the light collecting portion though entering the prism panel 7 from the entrance surface 7m. Therefore, the guide number can be further improved.

Moreover, forming the concave portion 7c on the prism panel 7 can keep part of the prism panel 7, which is closest to the front end of the inclined portion 8g of the reflective member 8 when no concave portion 7c is formed, away from the front end of the inclined portion 8g. Therefore, even if the front end of the inclined portion 8g, that is, the reflective member 8 is disposed close to the prism panel 7, the prism panel 7 can be prevented from melting or deforming due to heat transmitted to the inclined portion 8g from the Xe tube 9.

As described above, according to the embodiment, since the concave portions 7c which are concave so as to be away from the front ends of the inclined portions 8g of the reflective member 8 are formed on the light entrance side surface of the prism panel 7, the reflective member 8 (the front end of each inclined portion 8g) whose temperature becomes high can be disposed close to the prism panel 7. Therefore, miniaturization of the flash unit 6 (reduction of a thickness thereof) can be achieved.

Furthermore, forming the refractive surface 7c1 (and the reflective surface) in the concave portion 7c makes it possible to introduce light, which is not reflected by the inclined portions 8g and does not reach the entrance surface 7m of the prism panel 7 in the light from the Xe tube 9, to the required irradiation range through the exit surface 7n of the prism panel 7. This can improve utilization efficiency of the light from the Xe tube 9, and therefore can achieve bright illuminate for the required irradiation range.

In addition, since the prism panel 7 formed of the optical organic polymeric material has a shape covering most part of the reflective member 8 in this embodiment, the creepage distance required for insulation between the chassis 1 and the reflective member 8 can be increased. Therefore, a structure in which leakage of the voltage for light emission of the Xe tube such as a trigger voltage and a light emission voltage is hard to occur can be obtained.

Moreover, since the aperture 8h of the reflective member 8 and the entrance surface 7m of the prism panel 7 can be formed so as to have substantially a same width (height) in this embodiment, a height of the prism panel 7 can be reduced. This embodiment enables not only efficient light irradiation from the prism panel 7 (that is, the exit surface 7n) having such a reduced height, but also realization of a flush unit advantageous for miniaturization of the entire camera.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, although the concave portion 7c is formed on the prism panel 7 so as to have the V-groove cross sectional shape in the above embodiment, the concave portion may be formed so as to have a shape other than the V-groove cross sectional shape such as a concave curved shape.

In addition, the above embodiment described a compact digital still camera with a built-in flash unit. However, alternative embodiments of the present invention include an illumination apparatus for various image pickup apparatuses such as a single-lens reflex camera and a video camera, an illumination apparatus externally mounted to the image pickup apparatus, and an illumination apparatus used for optical apparatuses other than the image pickup apparatus.

This application claims the benefit of Japanese Patent Application No. 2008-232118, filed on Sep. 10, 2008, which is hereby incorporated by reference herein in its entirety.

What is claimed is:
1. An illumination apparatus comprising:
a light source;
an optical member configured to at least transmit therethrough light from the light source; and
a reflective member configured to include a reflective portion which extends closer to the optical member than the light source and reflects the light from the light source to cause the light to enter the optical member, wherein an upper inner surface of the optical member and a lower inner surface of the optical member disposed between a light entrance surface of the optical member and an exit surface of the optical member are formed as internal reflective surfaces, wherein a concave portion is formed in upper and lower outside areas located outside the light entrance surface where the light reflected by the reflective portion reaches, wherein the concave portion includes a refractive surface refracting light, and wherein the refractive surface reflects light proceeding toward the refractive surface from the light entrance surface of the optical member, and the reflected light introduces to the exit surface of the optical member.

2. The illumination apparatus according to claim 1, wherein the reflective member is configured to include as the reflective portion a first reflective portion and a second reflective portion each of which extends closer to the optical member than the light source and reflects the light from the light source to cause the light to enter the optical member, and wherein the concave portion includes a first concave portion and a second concave portion, wherein the first concave portion is concaved so as to be away from front end of the first reflective portion, and wherein the second concave portion is concaved so as to be away from front end of the second reflective portion.

3. An image pickup apparatus capturing an image of an object illuminated with light from an illumination apparatus, the image pickup apparatus comprising:

the illumination apparatus which comprises:
   a light source;
   an optical member configured to at least transmit therethrough light from the light source; and
   a reflective member configured to include a reflective portion which extends closer to the optical member than the light source and reflects the light from the light source to cause the light to enter the optical member, wherein an upper inner surface of the optical member and a lower inner surface of the optical member disposed between a light entrance surface of the optical member and an exit surface of the optical member are formed as internal reflective surfaces, wherein a concave portion is formed in upper and lower outside areas located outside the light entrance surface where the light reflected by the reflective portion reaches, wherein the concave portion includes a refractive surface refracting light, and wherein the refractive surface reflects light proceeding toward the refractive surface from the light entrance surface of the optical member, and the reflected light introduces to the exit surface of the optical member.

\* \* \* \* \*